US010924608B1

(12) United States Patent
Keiser et al.

(10) Patent No.: US 10,924,608 B1
(45) Date of Patent: *Feb. 16, 2021

(54) COMMUNICATION VOLUME LEVEL CHANGE DETECTION

(71) Applicant: Securus Technologies, Inc., Carrollton, TX (US)

(72) Inventors: Luke Keiser, Frisco, TX (US); Stephen Schneider, Lake Ozark, MO (US)

(73) Assignee: Securus Technologies, LLC, Carrollton, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/532,074

(22) Filed: Aug. 5, 2019

Related U.S. Application Data

(63) Continuation of application No. 15/662,812, filed on Jul. 28, 2017, now Pat. No. 10,375,234.

(51) Int. Cl.
| | |
|---|---|
| *H04M 3/22* | (2006.01) |
| *H04H 60/58* | (2008.01) |
| *H04M 1/82* | (2006.01) |
| *H04M 3/42* | (2006.01) |

(52) U.S. Cl.
CPC .......... *H04M 3/2281* (2013.01); *H04H 60/58* (2013.01); *H04M 1/82* (2013.01); *H04M 3/2272* (2013.01); *H04M 3/42221* (2013.01)

(58) Field of Classification Search
CPC ........ H04M 1/67; H04M 1/82; H04M 3/2272; H04M 3/2281; H04M 3/38; H04M 3/42221; H04H 60/58; H04H 60/64
USPC ......... 700/94; 381/58; 379/24, 29.03, 93.02, 379/114.14, 168, 187, 199, 207.06, 377
See application file for complete search history.

(56) References Cited

U.S. PATENT DOCUMENTS

| | | | |
|---|---|---|---|
| 5,539,812 A | 7/1996 | Kitchin et al. | |
| 5,768,355 A | 6/1998 | Salibrici et al. | |
| 6,141,406 A | 10/2000 | Johnson | |
| 7,106,843 B1 | 9/2006 | Gainsboro et al. | |
| 7,596,498 B2 | 9/2009 | Basu et al. | |
| 8,630,726 B2 | 1/2014 | Hodge et al. | |
| 2008/0198978 A1 | 8/2008 | Olligschlaeger | |

*Primary Examiner* — Jesse A Elbin
(74) *Attorney, Agent, or Firm* — Fogarty LLP

(57) ABSTRACT

Systems and methods for detecting volume level changes in communications are described herein. In some embodiments, a system comprises a computer system. The computer system comprises at least one processor and a memory coupled to the at least one processor. The memory stores program instructions that are executable by the at least one processor to cause the computer system to perform tasks. The tasks include recording a communication that comprises audio, and analyzing the audio of the communication. The analysis of the audio is operable to detect a change in a volume level of the audio that indicates an occurrence of a potential event of interest. The tasks also include creating and storing an information record corresponding to the communication in a second database. The information record includes an indication of the detected change in the volume level.

20 Claims, 4 Drawing Sheets

COMMUNICATION VOLUME LEVEL CHANGE DETECTION

CROSS-REFERENCE TO RELATED APPLICATION

This is a continuation of, and claims benefit of, U.S. patent application Ser. No. 15/662,812, also entitled Communication Volume Level Change Detection, filed Jul. 28, 2017 and issued as U.S. Pat. No. 10,375,234 on Aug. 6, 2019, which is hereby incorporated herein by reference.

BACKGROUND

Correctional departments responsible for incarcerating inmates continue to develop methods and activities to rehabilitate the inmates for their subsequent release back into society. One aspect thought to aid in that transition is communication. By allowing prisoners to have some contact with friends and family while incarcerated, the justice system aims to facilitate their transition back into society upon release. Traditional forms of contact include telephone calls, in-person visitation, video visitation, etc. More recently, technological advances have allowed jails and prisons to provide other types of visitation, including individual-to-individual videoconferences and online chat sessions.

SUMMARY

Embodiments disclosed herein can provide for systems and methods for detecting volume level changes in communications, such as in communications with residents in a controlled-environment facility. Generally, systems and methods disclosed herein may detect volume level changes in audio of communications that may indicate, for example, that a participant is attempting to communicate information relating to an illicit activity and/or is being provoked. An indication, such as a flag, can be created when such a volume level change occurs to facilitate in identifying communications for concurrent or subsequent monitoring and/or investigation. Other advantages of embodiments may also be achieved.

In accordance with some embodiments, a system includes a computer system comprising at least one processor and a memory coupled to the at least one processor. The memory stores program instructions executable by the at least one processor to cause the computer system to perform tasks. The tasks include recording a communication in a first database. The communication comprises audio. The tasks further include analyzing the audio of the communication. The analysis of the audio is operable to detect a change in a volume level of the audio that indicates an occurrence of a potential event of interest. The tasks also include creating and storing an information record corresponding to the communication in a second database. The information record includes an indication of the detected change in the volume level of the audio that indicates the occurrence of the potential event of interest.

In accordance with some further embodiments, a method includes operating at least one computer system. Operating the at least one computer system includes analyzing audio of a communication to detect a change in a volume level of the audio that indicates an occurrence of a potential event of interest, and storing an indication of the detected change in an information record corresponding to the communication in a database. A copy of the communication is recorded.

In accordance with still further embodiments, a tangible computer-readable storage medium has program instructions stored thereon. Execution of the program instructions by at least one processor of a computer system causes the computer system to generate and store in a database a communication detail record (CDR) corresponding to a communication; detect a significant volume level change in audio of the communication; and store a flag in the CDR indicating where in the audio of the communication the significant volume level change was detected.

The foregoing has outlined rather broadly the features and technical advantages of some embodiments disclosed herein in order that the detailed description that follows may be better understood. Additional features and advantages will be described hereinafter which form the subject of the claims of the invention. It should be appreciated that the conception and specific embodiments disclosed may be readily utilized as a basis for modifying or designing other structures for carrying out the same purposes of the present invention. It should also be realized that such equivalent constructions do not depart from the invention as set forth in the appended claims. The features of some embodiments, together with some objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Reference will now be made to the accompanying drawings, wherein.

Figure 1:
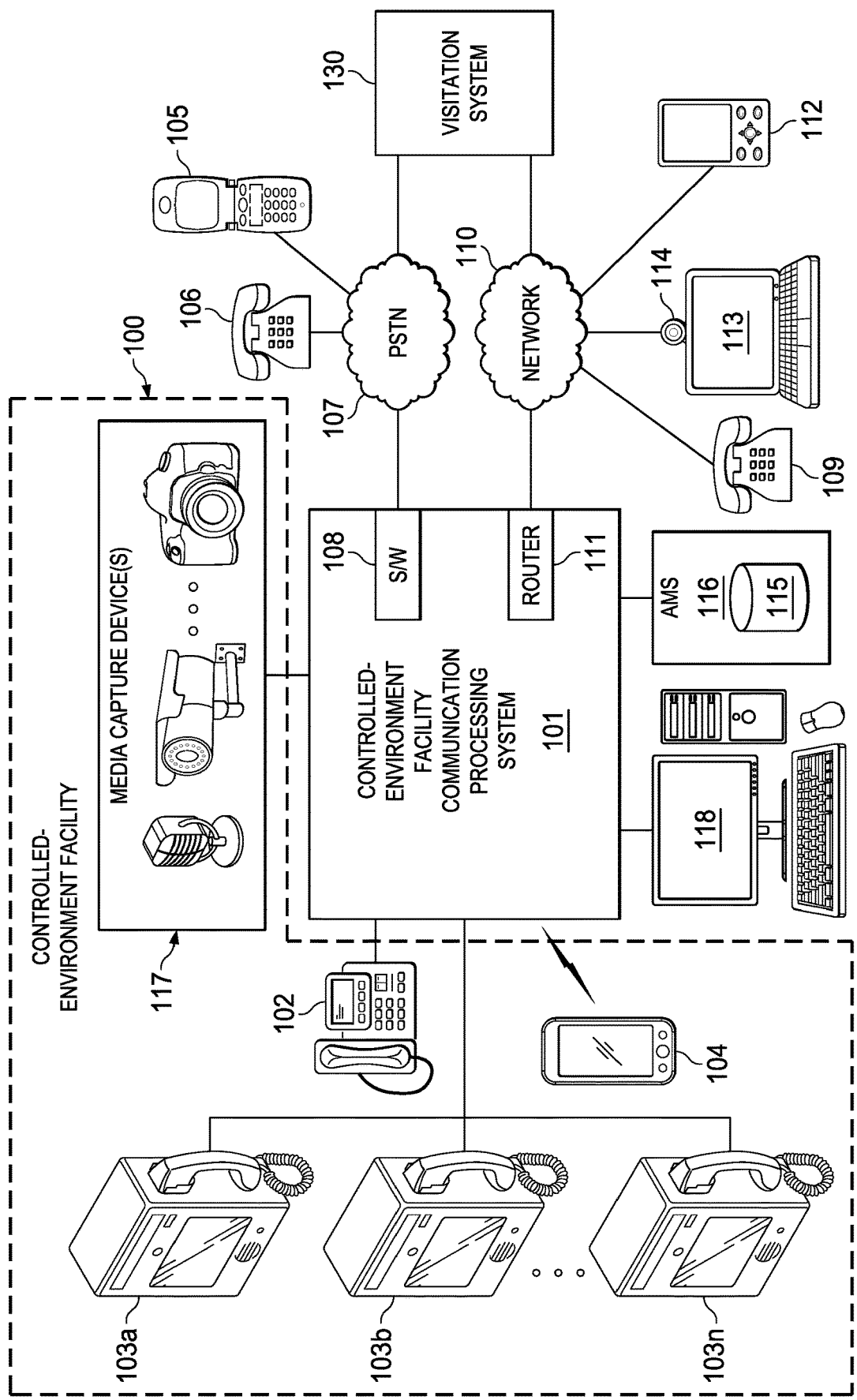
FIG. 1 is block diagram of an example of a system configured to provide communication services to a controlled-environment facility in accordance with some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

Some embodiments now will be described more fully hereinafter with reference to the accompanying drawings. Embodiments may take many different forms, and this disclosure should not be construed as limited to the embodiments set forth herein. Rather, these embodiments are provided so that this disclosure will be thorough and complete, and will fully convey the scope of the invention to those skilled in the art. One skilled in the art may be able to use the various embodiments.

This specification discloses systems and methods for detecting a significant volume level change in audio of a communication, such as telephone calls, videoconferences, etc. Once a significant volume level change is detected, various actions may be taken. For example, the communication can be recorded, and a flag may be stored indicating that a significant volume level change was detected in the communication. The flag can assist monitoring and/or investigative efforts to identify communications that contain a significant volume level change, which may be indicative of an attempt to communicate information relating to illicit activities and/or a provocation of a participant of the communication. Further, an alert may be sent to authorized personnel when a significant volume level change is detected, and/or the communication may be terminated when a significant volume level change is detected. As used herein, "significant volume level change" does not necessarily mean a change in volume level that is of a particular magnitude, but includes a volume level change that can be indicative of an event of interest (e.g., "significant") during a communication. Some of these systems and methods are described in the context of use with one or more controlled-environment facilities; however, aspects of the systems and methods may be used outside of and without regard to a controlled-environment facility.

Various types of controlled-environment facilities are present today, and persons may be voluntary or involuntary residents of such facilities, whether temporarily or permanently. Examples of controlled-environment facilities may include correctional institutions or facilities (e.g., municipal jails, county jails, state prisons, federal prisons, military stockades, juvenile facilities, detention camps, home incarceration environments, etc.), healthcare facilities (e.g., hospitals, nursing homes, mental health facilities, assisted living quarters, rehabilitation clinics, such as drug and alcohol rehabilitation facilities, etc.), restricted living quarters (e.g., hotels, resorts, camps, dormitories, barracks, etc.), and the like.

For convenience of explanation, various examples discussed herein are presented in the context of correctional facilities. For instance, in some of the implementations discussed below, a controlled-environment facility may be referred to as a jail or prison, and its residents may be referred to as arrestees, detainees, or inmates. It should be understood, however, that the systems and methods described herein may be similarly applicable to other types of controlled-environment facilities and their respective residents (e.g., a hospital and its patients, a school dormitory and its students, etc.).

FIG. 1 is block diagram of an example of a system configured to provide communication services to a controlled-environment facility according to some embodiments. As shown, communication processing system 101 may provide telephone services, videoconferencing, and/or other communication services to a controlled-environment facility 100. The communication processing system 101 may be implemented by one or more computer systems, an example of which is described below. In some cases, communication processing system 101 may be located in or remote from the controlled-environment facility 100. In some cases, communication processing system 101 may be centrally or remotely located with respect to one or more controlled-environment facilities and/or may provide communication services to multiple controlled-environment facilities. More generally, however, it should be noted that communication processing system 101 may assume a variety of forms, and may be configured to serve a variety of facilities and/or users, whether within or outside of a controlled-environment facility.

One or more resident communication devices are in the controlled-environment facility 100. In the illustrated example, the controlled-environment facility 100 includes one or more telephones 102, one or more smart terminals 103, and one or more personal computer wireless devices 104. In the illustrated example, the telephone 102 can be a digital telephone, such as implementing Voice over Internet Protocol (VOIP) communications, or another telephone. In some embodiments, the smart terminal 103 may be implemented as a computer-based system. For example, a smart terminal 103 may include a display (e.g., a touch-screen display or other electronic display), camera (e.g., a webcam), and handset. A handset may be similar to a traditional telephone handset including an earpiece portion (with a loudspeaker), a handle portion, and a mouthpiece portion (with a microphone). The smart terminal 103 can enable telephone calls via the traditional telephone handset. The smart terminal 103 may further include audio and video-conferencing capabilities, which may enable residents to participate in video visitation sessions with non-residents of the controlled-environment facility 100 via video call, secure online chat, etc. The smart terminal 103 can enable other forms of communication, such as emails, text messages, etc. Generally speaking, a smart terminal 103 may be disposed in a visitation room, in a pod, kiosk, etc. The personal computer wireless device 104 can be or include a tablet computing device, a laptop computer, a wireless smart telephone, and/or another device. The personal computer wireless device 104 can enable telephone calls, videoconferencing, emails, text messaging, and/or other communication formats.

Under the control of communication processing system 101, the resident communication devices (e.g., devices 102-104) of the controlled-environment facility 100 may be capable of communicatively connecting to an outside communication device, such as a device of a non-resident of the controlled-environment facility 100. The resident communication device may be communicatively coupled to an outside communication device through the communication processing system 101 to enable communications via, for example, calls, videoconferences, emails, text messaging, online chats, etc. As illustrated, the resident communication devices (e.g., devices 102-104) are communicatively coupled to the communication processing system 101. The communication processing system 101 includes a switch 108 that communicatively couples the communication processing system 101 to a Publicly Switched Telephone Network (PSTN) 107. A wireless mobile telephone 105 and a landline telephone 106 are communicatively coupled to the PSTN 107. Hence, a resident communication device (e.g., device 102-104) may be communicatively coupled to the wireless mobile telephone 105 and/or the landline telephone 106 via the communication processing system 101, the switch 108, and the PSTN 107.

The communication processing system 101 also includes a router 111 that communicatively couples the communication processing system 101 to a data network 110, such as a Wide Area Network (WAN), Local Area Network (LAN), the Internet, and/or a combination thereof. A digital telephone 109, a mobile computing device 112 (e.g., a mobile smart telephone, tablet, etc.), and a personal or laptop computer 113 (e.g., with a camera 114) are communicatively coupled to the data network 110. Hence, a resident communication device (e.g., device 102-104) may be communicatively coupled to the digital telephone 109, the mobile computing device 112, and/or the personal or laptop computer 113 via the communication processing system 101, the router 111, and the data network 110. A network connection between a resident communication device and an outside communication device through the data network 110 may be established and supported by an organization or commercial service that provides computer services and software for use in telecommunications and/or VOIP, such as SKYPE. Additionally or alternatively, the controlled-environment facility 100 and/or the destination may use videoconferencing equipment compatible with ITU H.323, H.320, H.264, and/or V.80, or other suitable standards.

In addition to providing certain communication operations, communication processing system 101 may permit processing of communications to restrict aspects of communications and/or to obtain information from communications. As illustrated, an Administration and Management System (AMS) 116 maintains a database 115, and the AMS 116 is communicatively coupled to the communication processing system 101. The AMS 116 may be implemented by one or more computer systems. The AMS 116 may be co-located with and/or located remotely from the communication processing system 101. The AMS 116 may store account information corresponding to each resident of the controlled-environment facility 100 in the database 115. The communication processing system 101 may access account information of a resident from the AMS 116 (and the database 115) when processing a communication from that resident.

As an example, in the context of a correctional facility, the database 115 may include as account information for each resident the resident's Pre-Approved Contact (PAC) list and Resident Profile Data (RPD) information. The PAC list may include identities, devices, phone numbers, etc. of non-residents with whom the resident is permitted to communicate (e.g., a whitelist) or with whom they are prohibited from communicating (e.g., a blacklist). The RPD information may include, for example: balances for inmate trust and calling accounts; trial schedule; conviction data; criminal record; sentencing data, such as time served, time remaining to be served, and release date; cell and cellmate assignments; inmate restrictions and warnings; commissary order history; telephone call history; call recordings; known or suspected gang or criminal affiliations; known or suspected affiliates, accomplices, or gang members; and/or any other information that may be relevant or useful to correctional facility staff to house and maintain inmates.

When a resident attempts to initiate a communication, such as a telephone call, videoconference, etc., through a resident communication device (e.g., device 102-104), the resident may be prompted by the communication processing system 101 to provide identification information, such as a PIN and/or biometrics (e.g., a voice sample, facial image, fingerprint, etc.). The identification information may be provided through the resident communication device and/or a media capture device 117 communicatively coupled to the communication processing system 101. The media capture device 117 may be part of an existing security surveillance infrastructure within the controlled-environment facility 100. In other cases, a media capture device 117 may be installed in physical proximity to resident communication devices (e.g., in a visitation room or in the same pod, wing, etc.) but be nonetheless distinct from those communication devices. For example, a PIN may be input through a keypad of the resident communication device (e.g., a punch pad or a touch screen pad). Further, as an example, biometrics like a voice sample may be provided through a microphone of the resident communication device and/or a microphone of a media capture device 117. Similarly, as an example, a facial image may be provided by a camera of the smart terminal 103 or personal computer wireless device 104 and/or by a camera (e.g., still capture and/or video camera) of the media capture device 117. With the identification information, the communication processing system 101 can compare the identification information against account information stored in the database 115 to identify which resident is initiating a communication and which corresponding account information to use to process the communication. For example, a PIN provided through the resident communication device can be compared to a PIN stored as account information, and/or a biometric sample can be compared to a corresponding biometric signature stored as account information.

In some examples, with the account information identified, the communication processing system 101 may attempt to ensure that the resident's communications (e.g., telephone calls, videoconferences, etc.) are performed only with non-residents whose identities, devices, phone numbers, etc. are listed in that resident's PAC list stored on the database 115. The communication processing system 101 may prohibit attempts to initiate communication with a non-resident whose identity, device, phone number, etc. is not included in the PAC list.

If the non-resident is included in the resident's PAC list (and/or if other conditions are satisfied, such as sufficient funds in a calling account), the resident is permitted to initiate and communicate with the non-resident via the communication processing system 101. In some embodiments, when a communication (e.g., a telephone call, a videoconference, etc.) between a resident and a non-resident takes place via communication processing system 101, a record of that communication is created in the form of a Communication Detail Record (CDR), also known as a Communication Data Record. In some cases, a CDR may include a type of record made from a video, also referred to as a Video Detail Record (VDR). A CDR can include a record produced by a telecommunications device that contains attributes that are specific to a communication of any type handled by that device.

As such, communication processing system 101 may maintain a record of data for each communication between resident communication devices (e.g., devices 102-104) and outside communication devices (e.g., devices 105, 106, 109, 112, or 113) in a database, such as the database 115. Specifically, communication processing system 101 may maintain CDRs for communications made to or from resident communication devices. In some cases, a separate CDR may be created for each communication. For example, a CDR may identify the resident by name, account number, or another identifier. Also, a CDR may include information to identify the source and destination of the communication, such as a called and calling telephone number or Internet Protocol (IP) address. For calls originated by residents, the particular resident communication device used by the resident may be identified as well as the particular destination device. Additionally or alternatively, a CDR may include call routing data that identifies PSTN, data, and/or wireless networks used for a communication. The name or identity of the party initiating the communication, if it is not the resident, may also be recorded. Moreover, billing data, such as information used to pay for the communication may be recorded. For example, a call may be paid for using collect call billing, a calling card account, prepaid account, a commissary account, or charges to the called or calling party's Local Exchange Carrier (LEC).

A CDR may further include a digital media file and/or a reference to a digital media file stored in a database. Examples of digital media files include, but are not limited to, still photograph(s), video, and/or audio. These media files may be obtained or captured, for example, directly via smart resident communication devices, such as the smart terminal 103 and personal computer wireless device 104, operated by a resident. Additionally or alternatively, digital media files may be obtained or captured by dedicated media capture devices 117 (e.g., cameras, camcorders, microphones, audio recorders, etc.). Additionally or alternatively, digital media files may be captured by the outside communication device (e.g., devices 113 and 114) of a non-resident with whom a resident of the controlled-environment facility 100 is communicating. Once captured by the resident communication smart device and/or media capture devices 117, one or more media files may be added to a CDR. In some implementations, the media file may itself be included in the CDR. Additionally or alternatively, a reference or path to the data file stored elsewhere may be added to the CDR. Also, communication processing system 101 may add the biometric-based identification of parties to the CDR. The exact format of the CDR, as well as its attributes, may vary and/or may be configurable by an administrator or user.

Further, the communication is recorded, and a copy of the recording or a reference to the copy of the recording may be stored in the CDR real-time for later review and analysis. In other cases, the communication may be transcribed, and the transcription may also be stored in the CDR.

The communication processing system 101 is operable to analyze audio in the communication. The communication processing system 101 may analyze the audio concurrently while the communication is on-going and/or after the communication has concluded. The communication processing system 101 is operable to determine significant volume level changes in the audio of the communication. Significant volume level changes may be indicative of significant events of interest. A significant decrease in volume by a participant to the communication may indicate, for example, an attempt to communicate information relating to confidential or illicit activities that the person does not want to be overheard by others. A significant increase in volume by a participant to the communication may indicate, for example, that that participant has become provoked (e.g., angry). The communication processing system 101 may detect significant volume level changes based on the communication individually and/or based on some number of previous communications.

To determine a significant volume level change based on the communication individually, the communication processing system 101 may create one or more respective audio streams for the participants of the communication. Each audio stream may isolate when one respective participant is speaking during the communication, and may remove or filter any background noise from the communication. A window is used to determine an average decibel (dB) level at which that respective participant is speaking during the communication. The window can be defined, for an on-going and/or concluded communication, from a beginning of the audio stream up to the instance in time that is being analyzed to detect a potential volume level change. The window can instead be defined, for an on-going and/or concluded communication, as some predefined duration preceding the instance in time that is being analyzed to detect a potential volume level change. In a concluded communication, the window can be defined as an entirety of the audio stream or some subset thereof. When determining the average dB level, periods of silence by the respective participant can be excluded so that various durations of silence do not adversely impact the average determination. With the average dB level determined, a difference between the average dB level and the dB level of the audio stream at the instance in time that is being analyzed to detect a potential volume level change is determined. If the magnitude of the determined difference exceeds some threshold, a significant volume level change is detected. The threshold can be some predefined dB amount, a percentage of the average dB level, some amount of a standard deviation of the dB level in the window, or another amount.

In another example, to determine a significant volume level change based on the communication individually, the communication processing system 101 may likewise create one or more respective audio streams for the participants of the communication. Each audio stream may isolate when one respective participant is speaking during the communication while excluding periods of silence, and may remove or filter any background noise from the communication. The communication processing system 101 can determine a rate of change in dB (e.g., by identifying a derivative of the dB of the audio stream). When the rate of change exceeds a predefined value or other amount, for example, a significant volume level change can be detected.

To determine a significant volume level change based on some number of previous communications, in some examples, a signature profile can be created based on the previous communications that is compared to the communication that is being analyzed for a potential significant volume level change. For example, using previous communications, respective average volume levels of an audio stream may be determined for each audio stream of each communication (e.g., while excluding periods of silence), and the volume levels of each audio stream can be normalized using its average volume level. By normalizing the volume levels, various variables may be removed, such as ability of a microphone to pick up sound, distance the person speaking has the microphone from the person's mouth, etc. Known significant volume level changes in the normalized volume levels can be used to identify attributes of significant volume level changes to create the signature profile. For example, the differences in volume levels can be averaged to obtain an averaged, normalized difference indicative of a significant volume level change; percentages of the differences with respect to the average corresponding to the difference can be averaged to obtain a percentage change indicative of a significant volume level change; and/or other techniques. Any one or more attributes indicative of a significant volume level change can be included in or be the signature profile. The signature profile can be specific to a participant, e.g., the resident participating in the communication, by analyzing previous communications of that participant, such as by isolating audio streams of that participant as described above. In such a scenario, the signature profile can be stored in a database, such as part of account information of that participant stored in the database 115. In other examples, the signature profile can be global to any participant, such as by isolating audio streams of a number of different participants of previous communications.

The communication processing system 101 can compare the signature profile to an on-going or concluded communication to determine if a significant volume level change occurred in the communication. For example, the communication processing system 101 may create one or more respective audio streams for the participants of the communication. Each audio stream may isolate when one respective participant is speaking during the communication, and may remove or filter any background noise from the communication. Each audio stream may be processed based on the format of the signature profile and/or the technique of the comparison. For example, if the signature profile is based on an averaged, normalized difference, the audio stream may be normalized based on a window (e.g., a portion of preceding audio stream if the communication is on-going, or an entirety of the audio stream if the communication is concluded) to then determine a normalized difference of the audio stream that is compared to the averaged, normalized difference of the signature profile. A significant volume level change can be identified at the instance being analyzed when the magnitude of the normalized difference exceeds the averaged, normalized difference of the signature profile. In other examples, the audio stream may be compared to the signature profile using a correlation technique, and a significant volume level change can be identified when the correlation technique indicates a strong correlation between the instance of the audio stream being analyzed and the signature profile.

In further examples, to determine a significant volume level change based on some number of previous communications, the communication processing system 101 may implement a machine learning algorithm, such as an Artificial Neural Network (ANN), Support Vector Machine (SVM), and/or other algorithms. Audio streams from previous communications may be classified as positive classification (a significant volume level change) or a negative classification (not a significant volume level change), such as by human analysis. The positive and negative classifications can then be used by the machine learning algorithm to create a structure to identify positive and negative instances in audio streams. The audio streams from the previous communications may be specific to one person and/or may be based on audio streams from multiple people. Using the machine learning algorithm, the communication processing system 101 may process isolated audio streams of on-going and/or concluded communications to identify a positive instance (where a significant volume level change occurs) and a negative instance (where a significant volume level change does not occur).

When the communication processing system 101 detects a significant volume level change, the communication processing system 101 can create and store a flag in the CDR of the communication. The flag can indicate that a significant volume level change occurred in the communication. The flag can indicate whether the significant volume level change was an increase or decrease in volume level. The flag can include, for example, a time stamp indicating where in a recording of the communication that the significant volume level change occurred. Further, the flag can include a pointer to a location in an electronic file of the recording of the communication where the significant volume level change occurred. The pointer may enable authorized personnel to, for example, click a link, control, or button in a user interface on a computer system (e.g., a monitoring system) that starts replay of the recording of the communication via the user interface at the instance in the communication where the significant volume level change occurred.

Additionally or alternatively, when the communication processing system 101 detects a significant volume level change in a communication, the communication processing system 101 can send an alert to authorized personnel. The alert can be in the form of a call, a text message, an email, etc. transmitted to a device of authorized personnel, such as a telephone, a computer system, etc. If the alert is transmitted while the communication is on-going, the device of the authorized personnel may be communicatively coupled to the on-going communication, such as by being conferenced into a telephone call or by accessing the communication through a user interface of a monitoring system. The device of the authorized personnel may be enabled to remotely listen to the communication while being muted, to barge into the communication to speak to one or more of the participants (which may mute communications to another participant), to terminate the communication (such as by pressing a designated button on a telephone keypad or a button on a user interface of a monitoring system), and/or other actions. If the alert is transmitted while the communication is on-going and/or after the communication has concluded, the alert may indicate to the authorized personnel which communication contained a significant volume level change for investigation.

Additionally or alternatively, when the communication processing system 101 detects a significant volume level change in a communication, the communication processing system 101 can terminate the communication. In some instances, a resident may possess sensitive information that authorized personnel do not want communicated. Hence, a significant volume level change may indicate that the resident is beginning to communicate that sensitive information, so the communication processing system 101 can terminate the communication in an attempt to prevent communication of that information.

One or more monitoring systems 118 are communicatively coupled to the communication processing system 101. The monitoring system 118 may be implemented by one or more computer systems, an example of which is described below. In some cases, the monitoring system 118 may be located in or remote from the controlled-environment facility 100, and/or located with or remote from the communication processing system 101. In some cases, monitoring system 118 may be centrally or remotely located with respect to one or more controlled-environment facilities and/or may provide communication services to multiple controlled-environment facilities. More generally, however, it should be noted that monitoring system 118 may assume a variety of forms, and may be configured to serve a variety of facilities and/or users, whether within or outside of a controlled-environment facility.

The monitoring system 118 may be used by authorized personnel to access on-going (i.e., real-time) and/or concluded communications for monitoring and/or investigative purposes. Alerts may be transmitted to the monitoring system 118 when significant volume level changes are detected by the communication processing system 101. Further, the monitoring system 118 may enable querying the database 115 via the communication processing system 101 for information contained in CDRs, recorded communications, etc. Access to communications and/or playback of communications may be enabled by the monitoring system 118.

Figure 2:
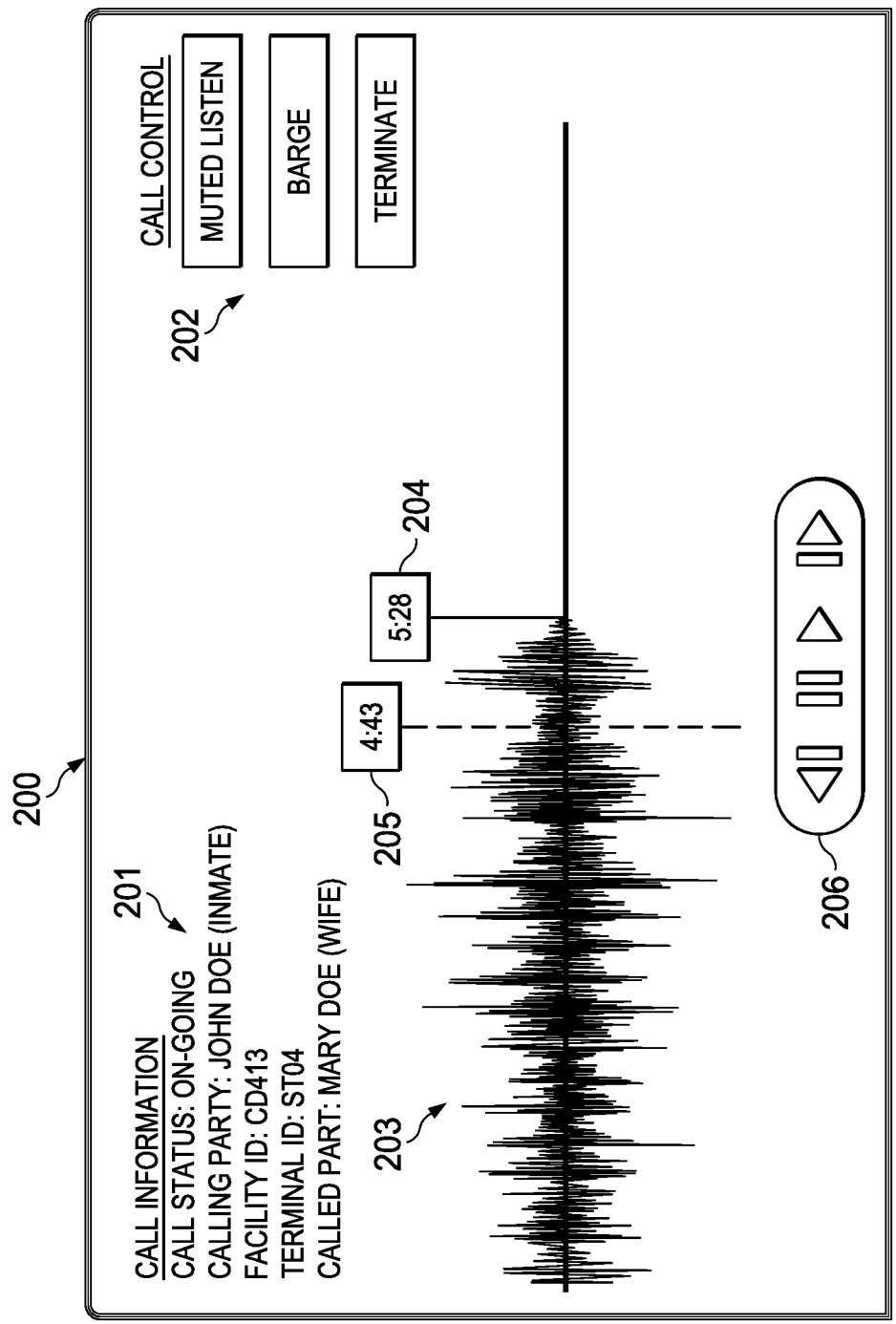
FIG. 2 is an example user interface of a monitoring application of a monitoring system in accordance with some embodiments.

FIG. 2 illustrates an example user interface 200 of a monitoring application of a monitoring system in accordance with some embodiments. The user interface 200 in this example is for monitoring telephone calls of inmates of a correctional facility. Various modifications may be made for other types of communications, such as videoconferencing, and for other types of facilities. The user interface 200 can be, for example, a portion of a monitoring application that provides access to communications for monitoring and/or investigative purposes to authorized personnel. The user interface 200 may be accessed during the regular course of monitoring and/or investigating and/or after an alert is received by authorized personnel, for example. In some examples, the monitoring application enables authorized personnel to query a database of CDRs for CDRs that include a flag indicating a significant volume level change during the call. The monitoring application provides a list of CDRs responsive to the query, and the authorized personnel may select (e.g., click on) a given one of the CDRs to initiate the user interface 200 in the monitoring application.

The user interface 200 includes a call information area 201 and a call control area 202. The call information area 201 can include information relating to the call, which may be populated from the CDR of the call. The call information area 201 includes an indication of the status of the call, such as whether the call is on-going (as illustrated in FIG. 2) or concluded. The call information area 201 further includes information relating to the participants of the call, such as the calling party and the called party. The call information area 201 also includes additional information relating to the inmate (e.g., the resident) such as the facility identification where the inmate is incarcerated and the identification of the device (e.g., a smart terminal 103) used for the communication. Other information may be included in the call information area 201, while some illustrated information may be omitted in other examples.

The call control area 202 includes buttons that permit authorized personnel to control one or more aspects of the call while the call is on-going. In some examples, the buttons may be grayed out or removed from the user interface 200 when the call has been concluded. As illustrated, the buttons allow authorized personnel to listen while being muted from the call ("MUTED LISTEN"), to barge into the call to speak with one or more of the participants of the call ("BARGE"), and to terminate the call ("TERMINATE"). Other functionality may also be included, such as an ability to bookmark various events in a recording of the call, which bookmarks may be stored in the corresponding CDR in the database.

The user interface 200 includes a playback waveform 203 of the call. The playback waveform 203 can be a graphical representation of a media file used to record the call, for example. When listening to the call, a current playback indication 204 can be shown in the playback waveform 203. The current playback indication 204 can default to the current dialogue of an on-going communication, at a beginning of the communication, or at any other instance in the communication (such as at a bookmark or flagged event). In some examples, the current playback indication 204 can be clicked and dragged to any instance in the playback waveform 203 to playback the communication at that instance.

An event flag 205 is illustrated on the playback waveform 203. The event flag 205 indicates an occurrence of a detected significant volume level change in the communication. In the illustrated example, the event flag 205 includes a time stamp (e.g., at time 4 minutes, 43 seconds into the call) with a pointer to a location in the media file used to record the call, such that the event flag 205 can be clicked by the authorized personnel to initiate playback of the communication at that instance. Although a single event flag 205 is shown to simplify the illustration, it will be understood that any number of event flags, markers, or other highlighting can be used to indicate events of interest in a call. For example, one type of event flag may indicate speech volume events in excess of a high threshold value and another type of event flag may indicate speech volume events below a low threshold value. Event flags may further indicate whether the event is associated with a calling or called party.

The user interface 200 can further include playback control buttons 206, such as play, pause, stop, fast forward, rewind, etc., that can be used to control playback of the communication. The user interface 200 can include other information, other functionality, and/or other aspects. For example, the playback waveform 203 can include other markers or event flags, such as detected words, detect actions (e.g., attempted call forwarding, etc.), and/or others.

Figure 3:
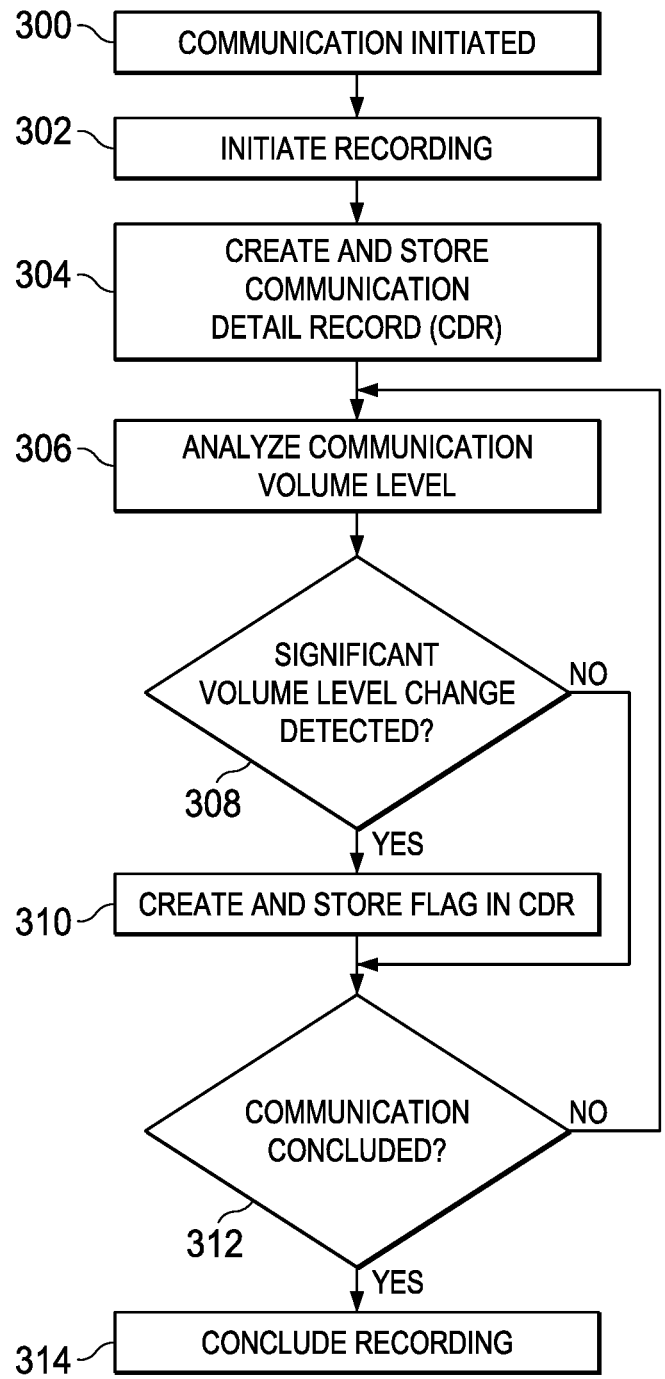
FIG. 3 is a flowchart of an example method for detecting a significant volume level change in a communication in accordance with some embodiments

FIG. 3 illustrates an example method for detecting a significant volume level change in a communication in accordance with some embodiments. Features may be added to and/or omitted from the illustrated method in other embodiments. Further, the method may be performed in any logical order. For example, the method of FIG. 3 is described in the context of analyzing a communication while the communication is on-going; however, other examples may analyze the communication after the communication is concluded.

At operation 300, a communication is initiated. The communication is initiated through a communication processing system. For example, a resident can initiate a communication from a resident communication device to an outside communication device of a non-resident. The communication includes audio, such as a telephone call, videoconferencing, and/or other communications.

At operation 302, recording of the communication is initiated. For example, the communication processing system may begin storing a copy of the communication in a database. At operation 304, a Communication Data Record (CDR) of the communication is created and stored. For example, the communication processing system may store the CDR in the same or different database in which the recording of the communication is stored. The CDR can include information as described above, include the recording and/or a reference to the recording.

At operation 306, the volume level of the audio of the communication is analyzed to detect a significant volume level change. The analysis can be performed by the communication processing system using any of the techniques described above, for example. At operation 308, a determination is made whether a significant volume level change was detected. If so, at operation 310, a flag is created and stored in the CDR. The flag can indicate that a significant volume level change was detected, as described previously. The communication processing system can create and store the flag. The method then proceeds to operation 312. If, at operation 308, a significant volume level change was not detected, the method proceeds to operation 312.

At operation 312, a determination is made whether the communication has concluded. If the communication has not concluded, the method returns to operation 306, where the volume level of the audio of the communication is analyzed. Hence, multiple instances of significant volume level changes can be detected in a communication, and multiple corresponding flags may be created and stored in the CDR. If the communication has concluded, the method proceeds to operation 314, where the recording of the communication is concluded and saved.

As described above, additional or alternative actions may be taken when a significant volume level has been detected. For example, when a significant volume change is detected in step 310, an alert may be sent to authorized personnel and/or the communication may be terminated. Other actions may be taken.

Further, with the CDR stored in a database, the database may be queried by authorized personnel to monitor communications and/or for investigative purposes. For example, any flag stored in a CDR may make certain communications more easily identifiable, e.g., by querying the database, to monitor and/or investigate those communications. Additionally, with a recording of the communication, authorized personnel may have access to playback the communication to ascertain a better understanding of what was being communicated.

Figure 4:
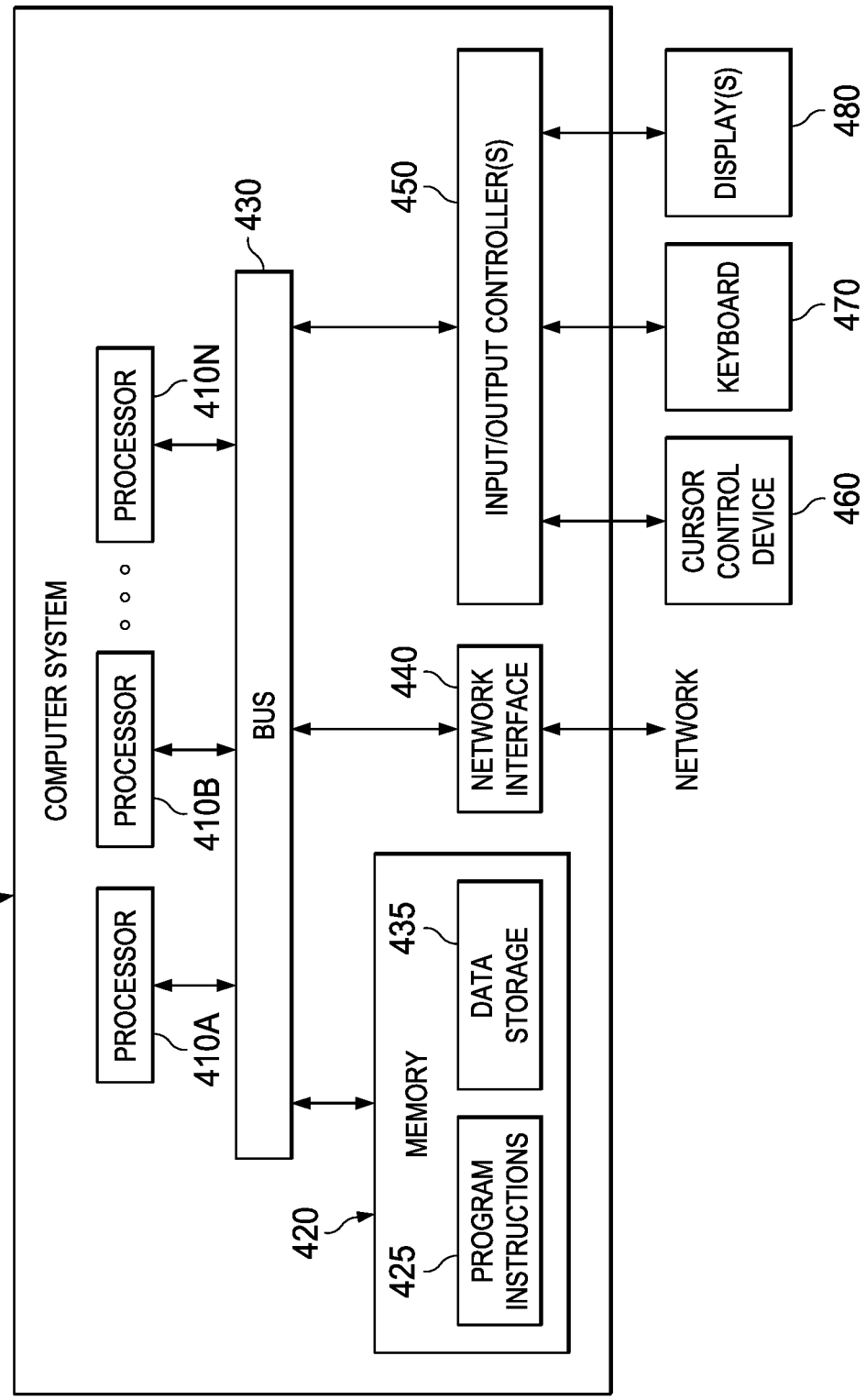
FIG. 4 is an example schematic of a computer system in accordance with some embodiments.

Some embodiments of systems and methods for detecting a significant volume level change in a communication, as described herein, may be implemented or executed, at least in part, by one or more computer systems. One such computer system is illustrated in FIG. 4. In various embodiments, computer system 400 may be a server, a mainframe computer system, a network appliance, a workstation, a network computer, a desktop computer, a laptop, a tablet, a handheld device, or the like. For example, in some cases, the communication processing system 101, smart terminal 103, personal computer wireless device 104, AMS 116, and monitoring system 118 shown in FIG. 1 may include at least one computer such as computer system 400. As explained above, in different embodiments these various computer systems may be configured to communicate with each other in any suitable way, such as, for example, via various networks.

As illustrated, computer system 400 includes one or more processors 410A-N coupled to a system memory 420 via bus 430. Computer system 400 further includes a network interface 440 coupled to bus 430, and one or more I/O controllers 450, which in turn are coupled to peripheral devices such as cursor control device 460, keyboard 470, display(s) 480, etc. Each of I/O devices 460, 470, 480 may be capable of communicating with I/O controllers 450, for example, via a wired connection (e.g., serial port, Universal Serial Bus port) or wireless connection (e.g., Wi-Fi, Bluetooth, Near Field Communications Link, etc.). Other devices may include, for example, microphones, antennas/wireless transducers, phone detection modules, etc.

In various embodiments, computer system 400 may be a single-processor system including one processor 410A, or a multi-processor system including two or more processors 410A-N (e.g., two, four, eight, or another suitable number). Processors 410 may be any processor capable of executing program instructions. For example, in various embodiments, processors 410 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 410 may commonly, but not necessarily, implement the same ISA. Also, in some embodiments, at least one processor 410 may be a graphics processing unit (GPU) or another dedicated graphics-rendering device.

System memory 420 may be configured to store program instructions and/or data accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. As illustrated, program instructions and data implementing certain operations and modules such as those described herein may be stored within system memory 420 as program instructions 425 and data storage 435, respectively. In other embodiments, program instructions and/or data may be received, sent, or stored upon different types of computer-accessible media or on similar media separate from system memory 420 or computer system 400.

A computer-accessible medium may include any tangible and/or non-transitory storage media or memory media such as electronic, magnetic, or optical media—e.g., disk or CD/DVD-ROM coupled to computer system 400 via bus 430. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 430 may be configured to coordinate I/O traffic between processor 410, system memory 420, and any peripheral devices in the computer system, including network interface 440 or other peripheral interfaces, such as I/O devices 460, 470, 480. In some embodiments, bus 430 may perform any necessary protocol, timing, or other data transformations to convert data signals from one component (e.g., system memory 420) into a format suitable for use by another component (e.g., processor 410). In some embodiments, bus 430 may include support for devices attached through various types of peripheral buses, such as a variant of the Peripheral Component Interconnect (PCI) bus standard or the Universal Serial Bus (USB) standard, for example. In some embodiments, the function of bus 430 may be split into two or more separate components, such as a northbridge chipset and a southbridge chipset, for example. In addition, in some embodiments some or all the functionality of bus 430, such as an interface to system memory 420, may be incorporated directly into processor(s) 410A-N.

Network interface 440 may be configured to allow data to be exchanged between computer system 400 and other devices attached to a network, such as other computer systems, or between nodes of computer system 400. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 450 may, in some embodiments, enable communications with one or more display terminals, keyboards, keypads, touchpads, scanning devices, voice or optical recognition devices, mobile devices, or any other devices suitable for entering or retrieving data by one or more computer system 400. Multiple I/O controllers 450 may be present in computer system 400 or may be distributed on various nodes of computer system 400. In some embodiments, I/O devices may be separate from computer system 400 and may interact with one or more nodes of computer system 400 through a wired or wireless connection, such as over network interface 440.

As shown in FIG. 4, system memory 420 may include program instructions 425, configured to implement certain embodiments described herein, and data storage 435, comprising various data may be accessible by program instructions 425. In an embodiment, program instructions 425 may include software elements, which may be configured to affect the operations discussed in FIGS. 1 through 3. Program instructions 425 may be implemented in various embodiments using any desired programming language, scripting language, or combination of programming languages and/or scripting languages (e.g., C, C++, C#, Java™ JavaScript™, Perl, etc.). Data storage 435 may include data that may be used in these embodiments (e.g., recorded communications, profiles for different modes of operations, etc.). In other embodiments, other or different software elements and data may be included.

A person of ordinary skill in the art will appreciate that computer system 400 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

It should be understood that the various operations described herein, particularly in connection with FIGS. 1 through 3, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

The various systems and methods illustrated in the figures and described herein represent example embodiments. The methods may be implemented in software, hardware, or a combination thereof. The order in which each operation of a given method is performed may be changed, and various elements of the systems or devices illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

What is claimed is:

1. A system, comprising:
   a computer system comprising at least one processor and a memory coupled to the at least one processor, the memory storing program instructions executable by the at least one processor to cause the computer system to:
   analyze audio of a communication, the analysis of the audio operable to detect a change in a volume level of the audio that indicates an occurrence of a potential event of interest; and
   create and store an information record corresponding to the communication in a database, the information record including a directional indication of any increase in the volume level, and any decrease in the volume level in the detected change of the audio that indicates the occurrence of the potential event of interest.

2. The system of claim 1, wherein execution of the program instructions further cause the computer system to:
   record the communication; and
   save resultingly recorded audio of the communication to the database.

3. The system of claim 1, wherein execution of the program instructions further cause the computer system to:
   record the communication; and
   save resultingly recorded audio of the communication to another database.

4. The system of claim 1, wherein a recording of the communication is stored as part of the information record.

5. The system of claim 1, wherein the communication is analyzed while the communication is on-going.

6. The system of claim 1, wherein the communication is analyzed after the communication has concluded.

7. The system of claim 1, wherein the analysis is operable to:
   determine an average volume level of a window of the audio of the communication; and
   determine a difference between the average volume level of the window and a volume level of an instance of the audio of the communication, wherein the change in the volume level of the audio that indicates the occurrence of the potential event of interest is detected when a magnitude of the difference exceeds a threshold.

8. The system of claim 1, wherein the analysis is operable to detect the change in a volume level of the audio that indicates an occurrence of a potential event of interest based on a signature profile of at least one previous communication having one or more known changes in volume level that indicated one or more events of interest.

9. The system of claim 8, wherein the at least one previous communication does not include a previous communication of a person that is not a participant to the communication being analyzed.

10. The system of claim 8, wherein the at least one previous communication includes a previous communication of a person that is not a participant to the communication being analyzed.

11. A method, comprising:
    operating at least one computer system comprising:
    analyzing audio of a communication to detect a change in a volume level of the audio that indicates an occurrence of a potential event of interest; and
    storing a directional indication of any increase in the volume level and any decrease in the volume level in the detected change in an information record corresponding to the communication in a database.

12. The method of claim 11, wherein operating the at least one computer system further comprises recording a copy of the communication in the database.

13. The method of claim 12, wherein the copy of the communication is recorded to conclusion before the audio of the communication is analyzed.

14. The method of claim 11, wherein operating the at least one computer system further comprises recording a copy of the communication in another database.

15. The method of claim 14, wherein the copy of the communication is recorded to conclusion before the audio of the communication is analyzed.

16. The method of claim 11, wherein analyzing the audio of the communication comprises:

determining an average volume level of a window of the audio of the communication; and determining a difference between the average volume level of the window and a volume level of an instance of the audio of the communication, wherein the change in the volume level of the audio that indicates the occurrence of the potential event of interest is detected when a magnitude of the difference exceeds a threshold.

17. The method of claim 11, wherein analyzing the audio of the communication comprises comparing a signature profile to the audio of the communication, wherein the signature profile is based on at least one previous communication having one or more known changes in volume level that indicated one or more events of interest.

18. The method of claim 17, wherein the at least one previous communication does not include previous audio of a person that is not a participant to the communication.

19. The method of claim 17, wherein the at least one previous communication includes previous audio of a person that is not a participant to the communication.

20. A tangible computer-readable storage medium having program instructions stored thereon that, upon execution by at least one processor of a computer system, cause the computer system to:

generate and store in a database a communication detail record (CDR) corresponding to a communication;

detect a significant volume level change in audio of the communication and direction of any increase in the volume level and direction of any decrease in the volume level; and store a flag in the CDR indicating where in the audio of the communication the significant volume level change was detected and indicating the direction of any increase or decrease in the volume level.

\* \* \* \* \*